US009772251B2

(12) United States Patent
Shinoda et al.

(10) Patent No.: US 9,772,251 B2
(45) Date of Patent: Sep. 26, 2017

(54) LEAK DETECTION SYSTEM, VIBRATION DETECTION DEVICE, INFORMATION PROCESSING DEVICE, AND LEAK DETECTION METHOD

(71) Applicant: NEC Corporation, Tokyo (JP)

(72) Inventors: Shigeki Shinoda, Tokyo (JP); Yasuhiro Sasaki, Tokyo (JP); Masatake Takahashi, Tokyo (JP); Shohei Kinoshita, Tokyo (JP); Hiromi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 184 days.

(21) Appl. No.: 14/780,126

(22) PCT Filed: Mar. 20, 2014

(86) PCT No.: PCT/JP2014/057848
§ 371 (c)(1),
(2) Date: Sep. 25, 2015

(87) PCT Pub. No.: WO2014/156990
PCT Pub. Date: Oct. 2, 2014

(65) Prior Publication Data
US 2016/0076964 A1  Mar. 17, 2016

(30) Foreign Application Priority Data

Mar. 27, 2013 (JP) ................. 2013-065569

(51) Int. Cl.
*G01M 3/24* (2006.01)
*H04Q 9/00* (2006.01)

(52) U.S. Cl.
CPC .............. *G01M 3/243* (2013.01); *G01M 3/24* (2013.01); *H04Q 9/00* (2013.01)

(58) Field of Classification Search
CPC .......... G01M 3/243; G01M 3/24; G01M 3/00; H04Q 9/00
See application file for complete search history.

(56) References Cited

U.S. PATENT DOCUMENTS

2005/0279169 A1* 12/2005 Lander ................. G01M 3/243
73/592
2011/0093220 A1   4/2011 Yang et al.
(Continued)

FOREIGN PATENT DOCUMENTS

JP         9-23483        1/1997
JP         11-101705      4/1999
(Continued)

OTHER PUBLICATIONS

International Search Report mailed Jun. 17, 2014 in corresponding PCT International Application.

*Primary Examiner* — Hezron E Williams
*Assistant Examiner* — David Z Huang
(74) *Attorney, Agent, or Firm* — Finnegan, Henderson, Farabow, Garrett & Dunner, L.L.P.

(57) ABSTRACT

A vibration detection device (10) is provided with a vibration detection unit (110), a sensor-side leak determination unit (120), a first transmission unit (130), and a second transmission unit (140). The vibration detection unit (110) detects vibration transmitted through piping (30). The sensor-side leak determination unit (120) determines whether or not there is a possibility of a leak in the piping (30) based on a measurement result of the vibration detection unit (110). When the sensor-side leak determination unit (120) determines that there is a possibility of a leak, the first transmission unit (130) transmits provisional leak information to an information processing device (20). The provisional leak information indicates that there is a possibility of a leak in the piping (30). When waveform request information indi- (Continued)

cating a request for waveform data of the vibration is received from the information processing device (20), the second transmission unit (140) transmits waveform data measured by the vibration detection unit (110) to the information processing device (20).

20 Claims, 13 Drawing Sheets

(56) References Cited

U.S. PATENT DOCUMENTS

| | | | |
|---|---|---|---|
| 2012/0007743 A1* | 1/2012 | Solomon | G01M 3/243 340/605 |
| 2013/0036796 A1* | 2/2013 | Fleury, Jr. | G01M 3/00 73/40.5 R |
| 2014/0121999 A1* | 5/2014 | Bracken | G01M 3/243 702/51 |
| 2015/0241297 A1* | 8/2015 | Hoshuyama | G01M 3/243 702/51 |

FOREIGN PATENT DOCUMENTS

| | | |
|---|---|---|
| JP | 2002-310840 | 10/2002 |
| JP | 2005-134300 | 5/2005 |

\* cited by examiner

LEAK DETECTION SYSTEM, VIBRATION DETECTION DEVICE, INFORMATION PROCESSING DEVICE, AND LEAK DETECTION METHOD

CROSS-REFERENCE TO RELATED PATENT APPLICATIONS

This application is a National Stage Entry of International Application No. PCT/JP2014/057848, filed Mar. 20, 2014, which claims priority from Japanese Patent Application No. 2013-065569, filed Mar. 27, 2013. The entire contents of the above-referenced applications are expressly incorporated herein by reference.

TECHNICAL FIELD

The present invention relates to a leak detection system, a vibration detection device, an information processing device, and a leak detection method.

BACKGROUND ART

Since a water service pipe or a gas pipe is buried in the ground, it is difficult to find a leak. In contrast, Patent Document 1 describes that a plurality of pressure sensors are provided to piping and detection results of these pressure sensors are transmitted to a device in a management center. The device of the management center processes the transmitted detection results, thereby detecting a leak point.

Patent Document 2 describes that a plurality of vibration sensors are attached to piping at intervals in the extension direction of the piping, and a leak position is specified based on detection results of the vibration sensors.

RELATED DOCUMENT

Patent Document

[Patent Document 1] Japanese Unexamined Patent Application Publication No. 9-23483
[Patent Document 2] Japanese Unexamined Patent Application Publication No. 2005-134300

SUMMARY OF THE INVENTION

Since the full extension of the water service pipe or the gas pipe is long, the number of vibration detection devices which are attached to the piping of the water service pipe or the gas pipe is very large. For this reason, it is necessary to reduce the maintenance frequency of the vibration detection devices as much as possible. And, in many cases, a battery is used as a power supply of each of the vibration detection devices attached to the piping. For this reason, in order to reduce the maintenance frequency of the vibration detection devices, it is necessary to reduce power consumption of the vibration detection devices.

An object of the invention is to provide a leak detection system capable of reducing power consumption of a vibration detection device, a vibration detection device, an information processing device, and a leak detection method.

According to the invention, there is provided a leak detection system including a plurality of vibration detection devices which are attached to piping at intervals in an extension direction of the piping, and an information processing device which detects a leak from the piping based on measurement results of the plurality of vibration detection devices.

Each of the plurality of vibration detection devices includes a vibration detection unit which detects vibration, a sensor-side leak determination unit which determines whether or not there is a possibility of a leak in the piping based on a measurement result of the vibration detection unit, a first transmission unit which, when the sensor-side leak determination unit determines that there is a possibility of a leak, transmits provisional leak information indicating that there is a possibility of a leak in the piping to the information processing device, and a second transmission unit which, when waveform request information indicating a request for waveform data of the vibration is received from the information processing device, transmits the waveform data measured by the vibration detection unit to the information processing device.

The information processing device includes a host-side leak determination unit which determines the presence or absence of a leak in the piping based on the number and the relative positions of the vibration detection devices transmitting the provisional leak information, a sensor control unit which, when the host-side leak determination unit determines that there is a leak, transmits the waveform request information to the vibration detection device transmitting the provisional leak information and a vibration detection device adjacent thereto, and a position determination unit which determines a leak position in the piping based on the waveform data transmitted from the vibration detection devices.

According to the invention, there is provided a leak detection system including a plurality of vibration detection devices which are attached to piping at intervals in an extension direction of the piping; and an information processing device which detects a leak from the piping based on measurement results of the plurality of vibration detection devices.

Each of the plurality of vibration detection devices includes a vibration detection unit which detects vibration, a sensor-side leak determination unit which determines whether or not there is a possibility of a leak in the piping based on a measurement result of the vibration detection unit, a first transmission unit which, when the sensor-side leak determination unit determines that there is a possibility of a leak, transmits provisional leak information indicating that there is a possibility of a leak in the piping to the vibration detection device adjacent thereto, and a second transmission unit which, when waveform request information indicating a request for waveform data of the vibration is received from the adjacent vibration detection device, transmits the waveform data measured by the vibration detection unit to the information processing device.

The information processing device includes a host-side leak determination unit which, when two vibration detection devices adjacent to each other transmit the provisional leak information, determines that there is a leak in the piping, a sensor control unit which, when the host-side leak determination unit determines that there is a leak, transmits the waveform request information to the two adjacent vibration detection devices, and a position determination unit which determines a leak position in the piping based on the waveform data transmitted from the vibration detection devices.

According to the invention, there is provided a vibration detection device which is attached to piping at an interval in an extension direction of the piping. The vibration detection device includes:

a vibration detection unit which detects vibration;

a sensor-side leak determination unit which determines whether or not there is a possibility of a leak in the piping based on a measurement result of the vibration detection unit;

a first transmission unit which, when the sensor-side leak determination unit determines that there is a possibility of a leak, transmits provisional leak information indicating that there is a possibility of a leak to an information processing device; and a second transmission unit which, when waveform request information indicating a request for waveform data of the vibration is received from the information processing device, transmits a measurement result of the vibration detection unit to the information processing device.

According to the invention, there is provided a vibration detection device which is attached to piping at an interval in an extension direction of the piping. The vibration detection device includes:

a vibration detection unit which detects vibration;

a sensor-side leak determination unit which determines whether or not there is a possibility of a leak in the piping based on a measurement result of the vibration detection unit;

first transmission unit which, when the sensor-side leak determination unit determines that there is a possibility of a leak, transmits provisional leak information indicating that there is a possibility of a leak to the vibration detection device adjacent thereto; and a second transmission unit which, when waveform request information indicating a request for waveform data of the vibration is received from the adjacent vibration detection devices, transmits a measurement result of the vibration detection unit to an information processing device.

According to the invention, there is provided an information processing device including:

a host-side leak determination unit which receives provisional leak information indicating that there is a possibility of a leak from one of a plurality of vibration detection devices attached to piping at intervals in an extension direction of the piping and determining the presence or absence of a leak in the piping based on the number and the relative positions of the vibration detection devices transmitting the provisional leak information;

a sensor control unit which, when the host-side leak determination unit determines that there is a leak, transmits waveform request information to the vibration detection device transmitting the provisional leak information and a vibration detection device adjacent thereto; and a position determination unit which determines a leak position in the piping based on waveform data transmitted from the vibration detection devices.

According to the invention, there is provided a leak detection method, including allowing an information processing device to:

receive provisional leak information indicating that there is a possibility of a leak from one of a plurality of vibration detection devices attached to piping at intervals in an extension direction of the piping;

determine the presence or absence of a leak in the piping based on the number and the relative positions of the vibration detection devices transmitting the provisional leak information;

transmit, when it is determined that there is a leak, waveform request information to the vibration detection device transmitting the provisional leak information and the vibration detection device adjacent thereto, the vibration detection devices which receive the waveform request information transmitting measured waveform data to the information processing device; and determine a leak position in the piping based on the waveform data transmitted from the vibration detection devices.

According to the invention, there is provided a leak detection method, including the steps of:

transmitting, when one of a plurality of vibration detection devices attached to piping at intervals in an extension direction of the piping determines that there is a possibility of a leak in the piping, provisional leak information indicating that there is a possibility of a leak in the piping, from the vibration detection device to the vibration detection device adjacent thereto;

transmitting, when it is determined that there is a possibility of a leak in the piping and the provisional leak information is received, waveform request information from the adjacent vibration detection device to the vibration detection device transmitting the provisional leak information;

transmitting measured waveform data from the vibration detection device transmitting the provisional leak information and the adjacent vibration detection device to an information processing device; and determining a leak position in the piping by the information processing device based on the waveform data transmitted from the vibration detection devices.

According to the invention, it is possible to reduce power consumption of the vibration detection device in the leak detection system.

BRIEF DESCRIPTION OF THE DRAWINGS

The above and other objects, features, and advantages will become further apparent from the following preferred exemplary embodiments and the accompanying drawings.

DESCRIPTION OF EXEMPLARY EMBODIMENTS

Figure 1:
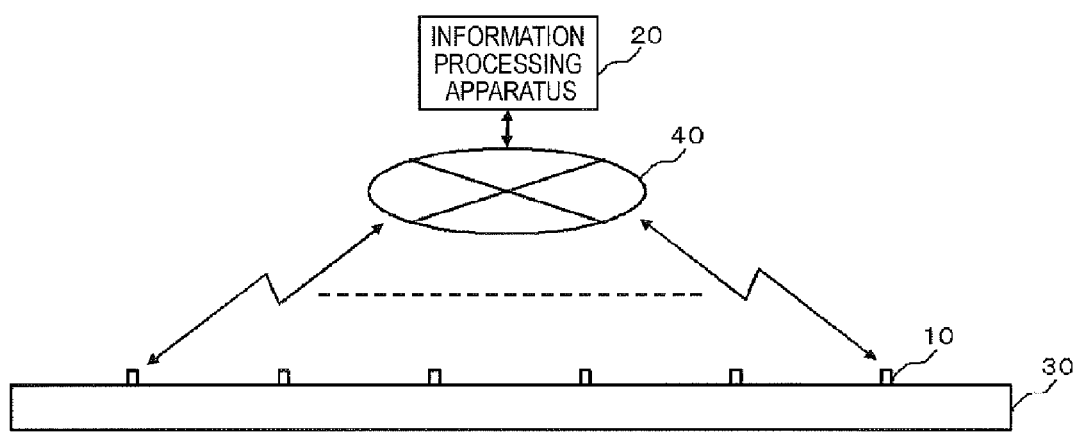
FIG. 1 is a diagram showing the configuration of a leak detection system according to a first exemplary embodiment.

Hereinafter, exemplary embodiments of the invention will be described referring to the drawings. In all drawings, the same constituent elements are represented by the same reference numerals, and description thereof will not be repeated.

In the following description, the respective constituent elements of each device show blocks in terms of functions instead of a configuration in terms of hardware. The respective constituent elements of each device are implemented by an arbitrary combination of hardware and software centering on a CPU, a memory, a program loaded on the memory, a storage medium, such as a hard disk, which stores the program, and a network connection interface. The implementation method and the device may be modified in various ways.

First Exemplary Embodiment

FIG. 1 is a diagram showing the configuration of a leak detection system according to a first exemplary embodiment. The leak detection system according to this exemplary embodiment is a system which detects a leak in piping 30, and is provided with a plurality of vibration detection devices 10 and an information processing device 20. The piping 30 is a pipe which carries a fluid, and is, for example, a water service pipe, a gas pipe, or a pipeline.

A plurality of vibration detection devices 10 are attached to the piping 30 at intervals in the extension direction of the piping 30. The information processing device 20 detects a leak from the piping 30 based on detection results of a plurality of vibration detection devices 10. The vibration detection devices 10 and the information processing device 20 perform communication through a communication network 40. When the piping 30 is buried in the ground, communication between the vibration detection devices 10 and the communication network 40 is performed in a wireless manner. At the time of wireless communication, the vibration detection devices 10 consume a large amount of electric power.

Figure 2:
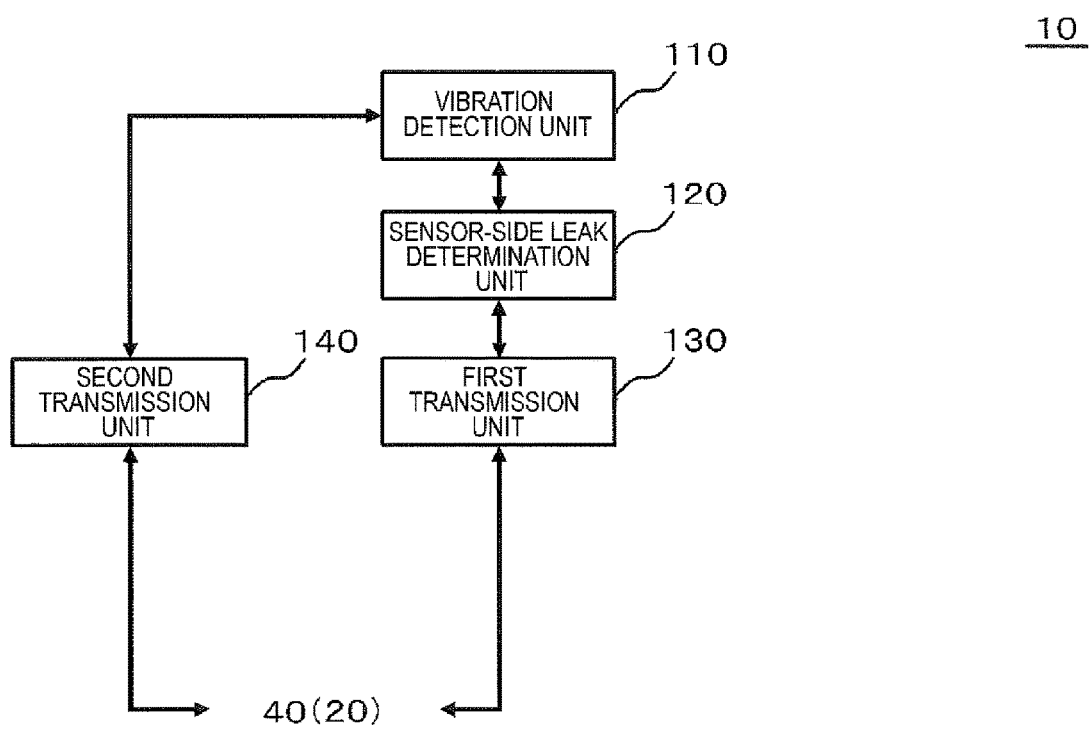
FIG. 2 is a diagram showing an example of the functional configuration of a vibration detection device.

FIG. 2 is a diagram showing an example of the functional configuration of the vibration detection device 10. The vibration detection device 10 is provided with a vibration detection unit 110, a sensor-side leak determination unit 120, a first transmission unit 130, and a second transmission unit 140. The vibration detection unit 110 detects vibration transmitted through the piping 30. The sensor-side leak determination unit 120 determines whether or not there is a possibility of a leak in the piping 30 based on a measurement result of the vibration detection unit 110. The first transmission unit 130 transmits provisional leak information to the information processing device 20 when the sensor-side leak determination unit 120 determines that there is a possibility of a leak. The provisional leak information indicates that there is a possibility of a leak in the piping 30. The second transmission unit 140 transmits waveform data measured by the vibration detection unit 110 to the information processing device 20 when waveform request information indicating a request for waveform data of vibration is received from the information processing device 20.

The vibration detection unit 110 is, for example, a vibration sensor or an acoustic sensor. The vibration detection unit 110 has, for example, an internal piezoelectric body, and detects vibration by detecting variation in voltage generation in the piezoelectric body due to vibration. The first transmission unit 130 and the second transmission unit 140 perform communication with the information processing device 20 through the communication network 40 in a wireless manner. For the first transmission unit 130 and the second transmission unit 140, the same wireless communication devices (receiver and transmitter) may be used, or different wireless communication devices may be used.

Figure 3:
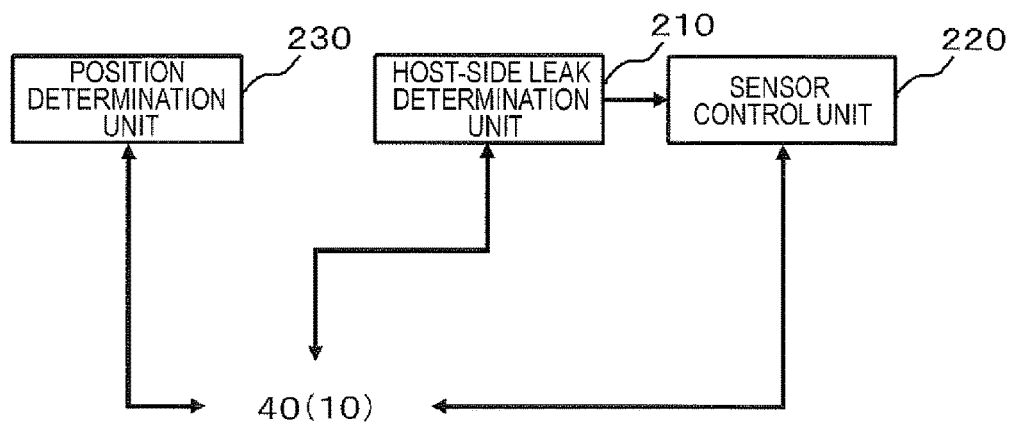
FIG. 3 is a diagram showing an example of the functional configuration of an information processing device.

FIG. 3 is a diagram showing an example of the functional configuration of the information processing device 20. The information processing device 20 is provided with a host-side leak determination unit 210, a sensor control unit 220, and a position determination unit 230. The host-side leak determination unit 210 determines the presence or absence of a leak in the piping 30 based on the number of vibration detection devices 10 transmitting provisional leak information and the relative positions of the vibration detection devices 10. The sensor control unit 220 transmits waveform request information to the vibration detection device 10 transmitting the provisional leak information and a vibration detection device 10 adjacent thereto when the host-side leak determination unit 210 determines that there is a leak. The position determination unit 230 determines a leak position in the piping 30 based on waveform data transmitted from the vibration detection devices 10.

Figure 4:
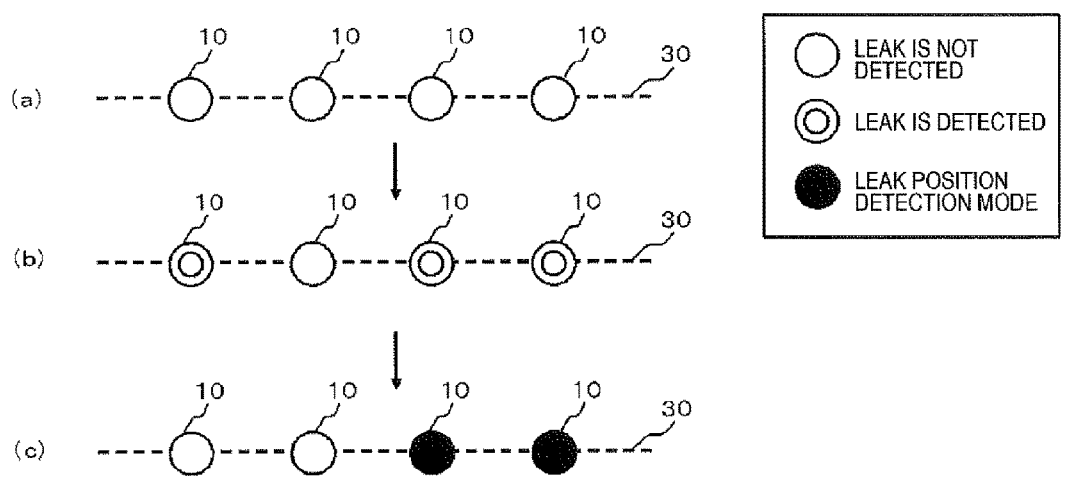
FIG. 4 is a diagram illustrating the outline of operations of a vibration detection device and an information processing device.

FIG. 4 is a diagram illustrating the outline of operations of the vibration detection device 10 and the information processing device 20. The vibration detection device 10 has two operation modes of a leak detection mode and a leak position detection mode. The leak detection mode is a mode in which the vibration detection unit 110, the sensor-side leak determination unit 120, and the first transmission unit 130 are operated. The leak position detection mode is a mode in which the vibration detection unit 110 and the second transmission unit 140 are operated. Of the two modes, the leak position detection mode has high power consumption.

First, as shown in FIG. 4(*a*), all of a plurality of vibration detection devices 10 are operated in the leak detection mode. The sensor-side leak determination unit 120 of each of the vibration detection devices 10 transmits provisional leak information to the information processing device 20 when it is determined that there is a possibility of a leak.

The sensor-side leak determination unit 120 of each of the vibration detection devices 10 determines that there is a possibility of a leak in the piping 30, for example, when amplitude exceeds a reference value in a measurement result of the vibration detection unit 110.

Vibration propagating through the vibration detection device 10 includes vibration due to disturbance, in addition to vibration due to a leak. As the disturbance, for example, there is vibration which occurs on the ground when the piping 30 is buried in the ground. In order to suppress erroneous detection by disturbance, the reference value used by the vibration detection unit 110 may be determined for each of a plurality of frequency bands. In this case, the sensor-side leak determination unit 120 determines that there is a possibility of a leak in the piping 30 when amplitude exceeds the reference value in each of a plurality of frequency bands. Each of a plurality of frequency bands is set so as to include a peak which occurs when there is a leak in the piping 30.

The sensor-side leak determination unit 120 may repeatedly determine whether or not there is a possibility of a leak in the piping 30 at a predetermined interval and may determine that there is a possibility of a leak in the piping 30 when amplitude exceeds the reference value a predetermined number of times in succession. Thus, it is possible to suppress erroneous detection by disturbance.

Even if so, the vibration detection device 10 is likely to erroneously detect vibration by disturbance as vibration due to a leak in the piping 30. Accordingly, the host-side leak determination unit 210 of the information processing device 20 determines the presence or absence of a leak in the piping 30 by determining whether or not the number of vibration detection devices 10 transmitting the provisional leak information and the relative positions of the vibration detection devices 10 satisfy a leak reference (FIG. 4(b)).

For example, when there is a leak in the piping 30, two vibration detection device 10 located to sandwich a place where the leak occurs transmit the provisional leak information with a high probability. For this reason, the host-side leak determination unit 210 of the information processing device 20 defines two adjacent vibration detection devices 10 transmitting the provisional leak information as the leak reference. The sensor control unit 220 transmits waveform request information to the two vibration detection devices 10.

When a certain vibration detection device 10 transmits the provisional leak information and a vibration detection device 10 adjacent to the vibration detection device 10 does not transmit the provisional leak information, the host-side leak determination unit 210 determines that the vibration detection device 10 erroneously detects vibration by disturbance as vibration due to a leak in the piping 30. In this case, the sensor control unit 220 does not transmit the waveform request information. However, the sensor control unit 220 may transmit the waveform request information to the vibration detection device 10 and the vibration detection device 10 adjacent thereto.

The operation mode of the two vibration detection devices 10 which receive the waveform request information is switched from the leak detection mode to the leak position detection mode (FIG. 4(c)).

Figure 5:
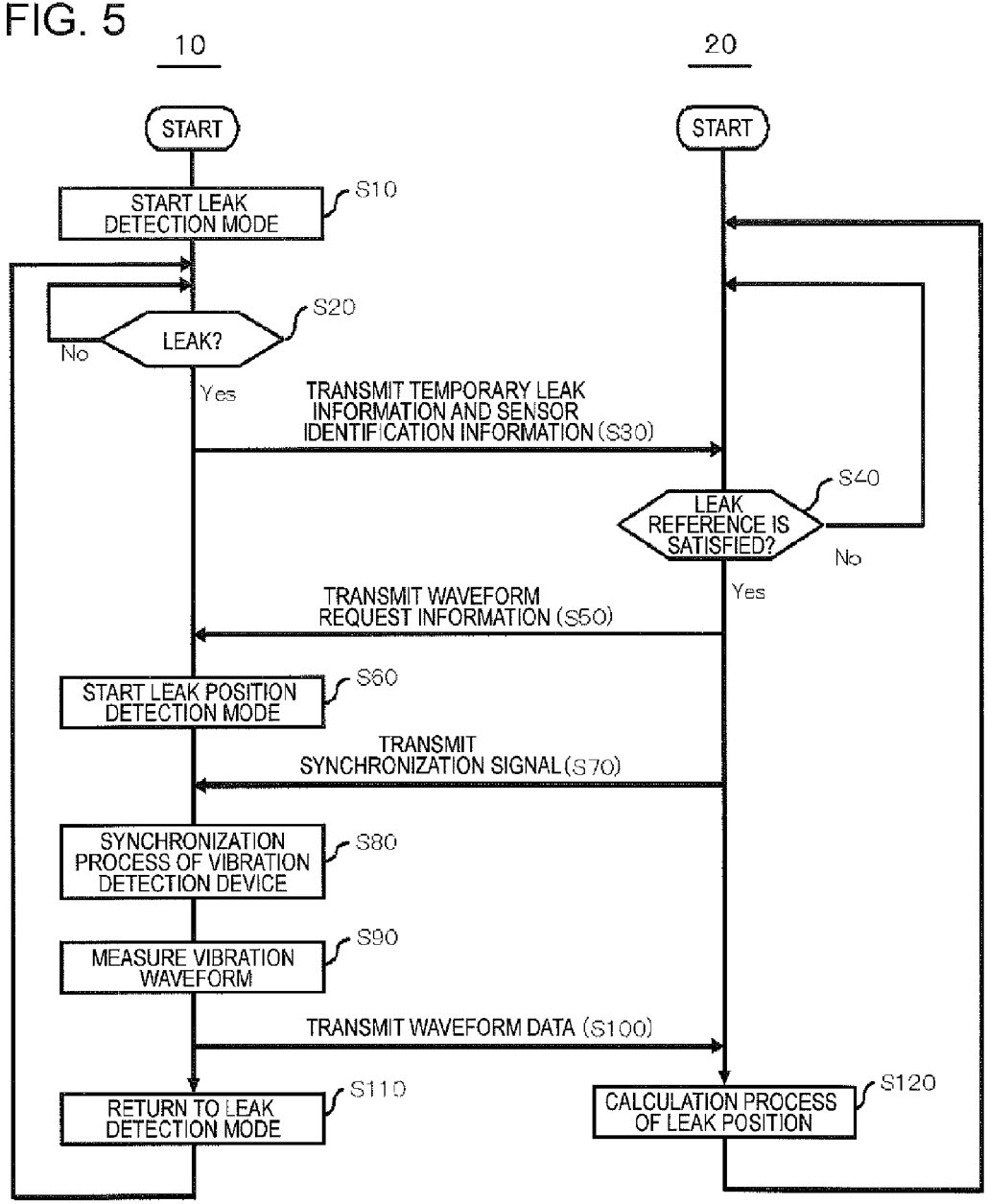
FIG. 5 is a flowchart showing a process described referring to FIG. 4 in detail.

FIG. 5 is a flowchart showing a process described referring to FIG. 4 in detail. In the flowchart shown in the drawing, each of a plurality of vibration detection devices 10 stores sensor identification information. The sensor identification information is information for identifying a plurality of vibration detection devices 10.

First, all of a plurality of vibration detection devices 10 are operated in the leak detection mode (Step S10). The sensor-side leak determination unit 120 of each of the vibration detection devices 10 regularly determines whether or not there is a leak based on a detection result of the vibration detection unit 110 (Step S20). The frequency is, for example, once per day; however, the invention is not limited thereto. When the sensor-side leak determination unit 120 determines that there is a leak (Step S20: Yes), the first transmission unit 130 transmits provisional leak information to the host-side leak determination unit 210 of the information processing device 20 along with the sensor identification information of the vibration detection device 10 (Step S30). The first transmission unit 130 may transmit the sensor identification information as the provisional leak information.

The host-side leak determination unit 210 of the information processing device 20 stores the sensor identification information of the vibration detection devices 10 in advance along with information indicating the arrangement order of the vibration detection devices 10. However, when the sensor identification information is allocated in the arrangement order of the vibration detection devices 10, such information does not need to be stored.

When the sensor identification information and the provisional leak information transmitted from the vibration detection device 10 satisfy the leak reference (Step S40: Yes), the host-side leak determination unit 210 transmits waveform request information to the vibration detection device 10 and adjacent vibration detection devices 10 (Step S50).

If the waveform request information is received, the vibration detection devices 10 start the leak position detection mode (Step S60).

Specifically, first, if the leak position detection mode is executed, the second transmission unit 140 of each of the vibration detection devices 10 receives a synchronization signal from the sensor control unit 220 of the information processing device 20 (Step S70). The synchronization signal is for synchronizing waveform data transmitted from the vibration detection devices 10 to the information processing device 20.

If the synchronization signal is received, the second transmission unit 140 of each of the vibration detection devices 10 performs a synchronization process (Step S80), and then starts to measure waveform data (Step S90). The synchronization process performed is, for example, to set the timing of starting to measure waveform data. After waveform data is measured for a predetermined time, the second transmission unit 140 transmits measured waveform data to the information processing device 20 (Step S100), and the process is returned to the leak detection mode (Step S110).

The position determination unit 230 of the information processing device 20 calculates a leak position in the piping 30 based on waveform data received from a plurality of vibration detection devices 10. For example, the position determination unit 230 calculates a leak position based on the time difference between peaks in two pieces of waveform data received from adjacent vibration detection devices 10 and the propagation speed of vibration in the piping 30 (Step S120).

According to this exemplary embodiment, normally, the vibration detection devices 10 do not perform communication with the information processing device 20. Only when it is determined that there is a high possibility of a leak, the provisional leak information indicating that there is a possibility of a leak is transmitted to the information processing device 20. Only when waveform data is requested from the information processing device 20, the vibration detection devices 10 transmit waveform data. In general, power consumption of the vibration detection devices 10 is increased when information is transmitted to the information processing device 20. Therefore, according to this exemplary embodiment, since the time when the vibration detection devices 10 transmit information to the information processing device 20 is shortened, it is possible to suppress power consumption of the vibration detection devices 10. With this, it is possible to reduce the maintenance frequency of the vibration detection devices 10.

Second Exemplary Embodiment

Figure 6:
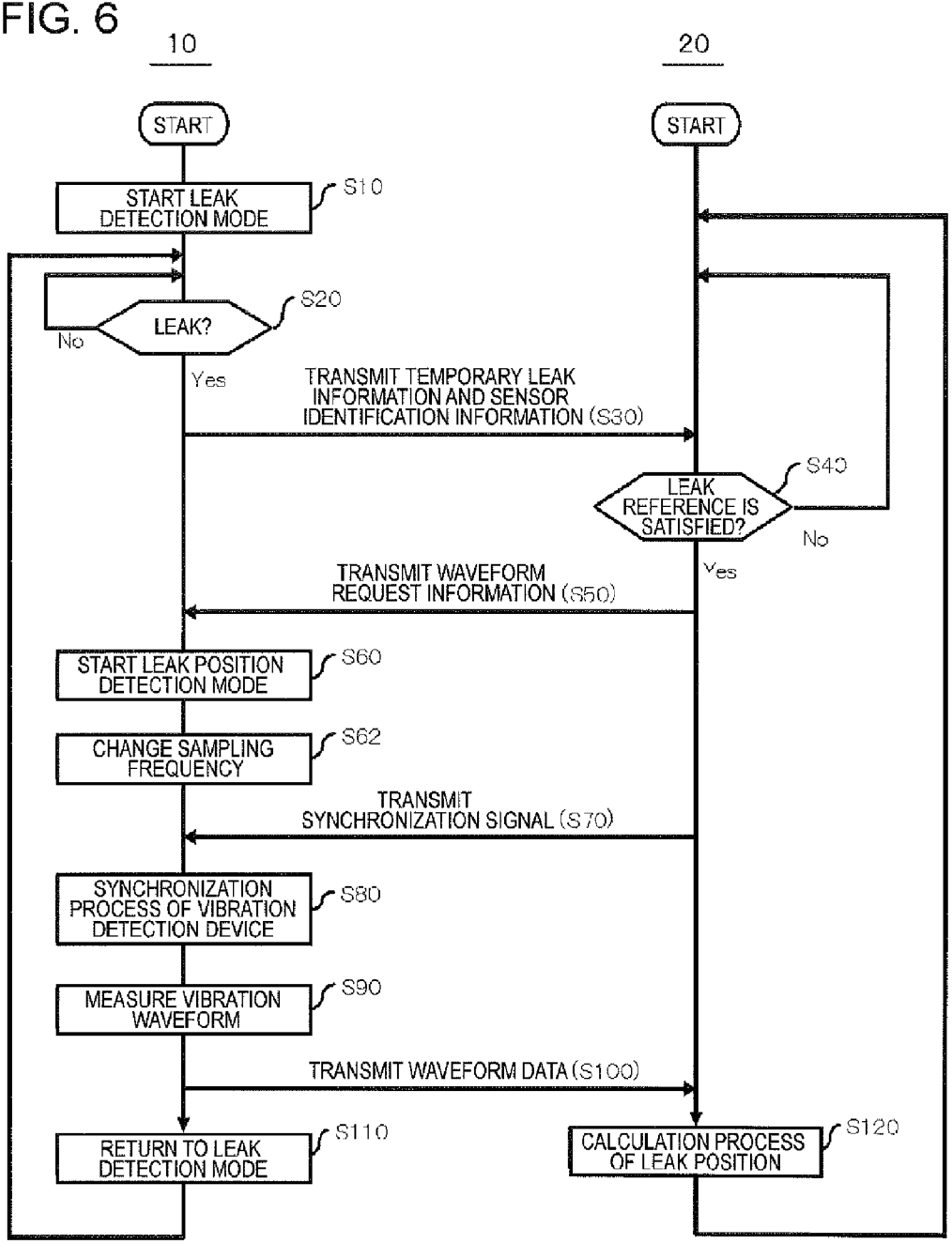
FIG. 6 is a flowchart showing an operation of a leak detection system according to a second exemplary embodiment.

FIG. 6 is a flowchart showing an operation of a leak detection system according to a second exemplary embodiment. The leak detection system according to this exemplary embodiment is the same as the leak detection system according to the first exemplary embodiment, excluding the following points.

First, the vibration detection unit 110 of each of the vibration detection devices 10 detects vibration at a predetermined interval, instead of constantly detecting vibration, before waveform request information is received from the information processing device 20. A sampling frequency by the vibration detection unit 110 at this time is set to a relatively low frequency for the sake of measuring low-frequency vibration (first sampling frequency).

When the second transmission unit 140 receives the waveform request information, the vibration detection unit 110 of each of the vibration detection devices 10 switches to the leak position detection mode (Step S60), and sets the sampling frequency to a second sampling frequency higher than the first sampling frequency (Step S62), thereby performing a broadband vibration measurement with a larger amount of information.

Also in this exemplary embodiment, it is possible to obtain the same effects as in the first exemplary embodiment. The vibration detection unit 110 of each of the vibration detection devices 10 measures displacement at the first sampling frequency lower than the second sampling frequency before the waveform request information is received. Therefore, it is possible to further reduce power consumption of the vibration detection devices 10.

Third Exemplary Embodiment

Figure 7:
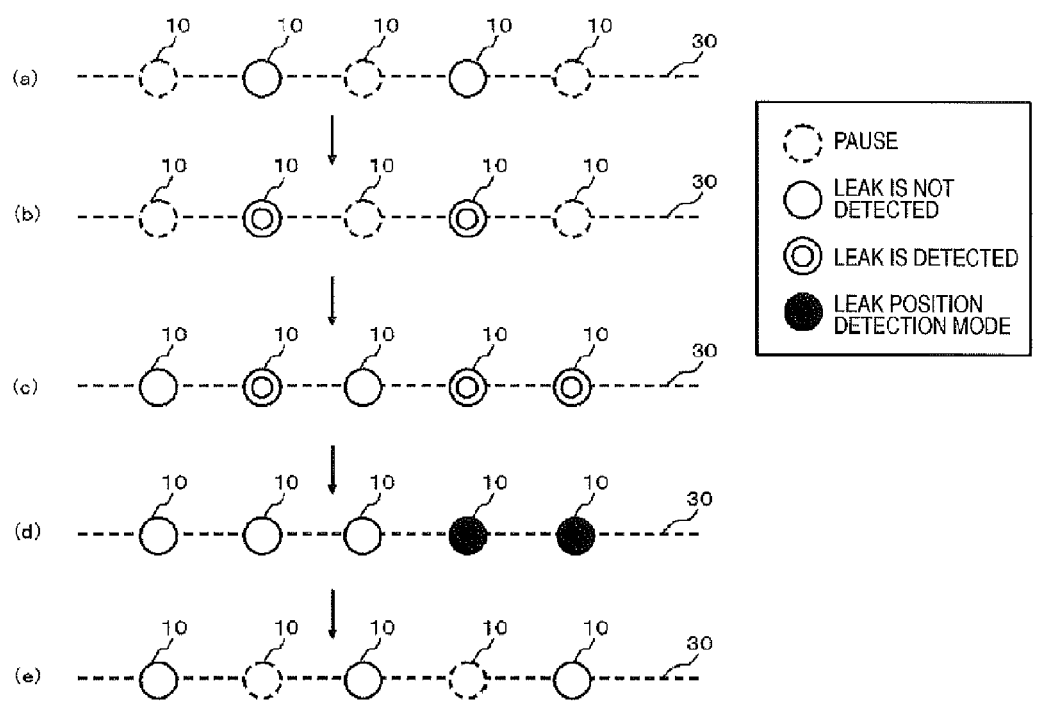
FIG. 7 is a diagram illustrating the outline of an operation of a leak detection system according to a third exemplary embodiment.

FIG. 7 is a diagram illustrating the outline of an operation of a leak detection system according to a third exemplary embodiment. The leak detection system according to this exemplary embodiment has the same configuration as the leak detection system according to the first or second exemplary embodiment, excluding the following points.

In this exemplary embodiment, the vibration detection devices 10 have a sleep mode, in addition to the leak detection mode and the leak position detection mode described above. The sleep mode is a mode in which, in addition to the second transmission unit 140, at least the sensor-side leak determination unit 120 is not operated. For this reason, power consumption of the vibration detection devices 10 in the sleep mode is smaller than power consumption of the vibration detection devices 10 in the leak detection mode. The sensor-side leak determination unit 120 starts to operate when operation instruction information is received from the information processing device 20.

As shown in FIG. 7(a), when detecting the presence or absence of a leak, the sensor control unit 220 of the information processing device 20 selects the vibration detection devices 10 to be operated at intervals of a predetermined number of vibration detection devices 10 in the extension direction of the piping 30 and transmits operation instruction information to the selected vibration detection devices 10. In the example shown in FIG. 7(a), the information processing device 20 causes every other vibration detection device 10 to be operated.

As shown in FIG. 7(b), when it is determined that there is a possibility of a leak in the piping 30, the sensor-side leak determination unit 120 of each of the vibration detection devices 10 in operation transmits the provisional leak information to the information processing device 20. The information processing device 20 transmits the operation instruction information to the vibration detection devices 10 located adjacent to the vibration detection devices 10 transmitting the provisional leak information. This makes the vibration detection devices 10 located adjacent to the vibration detection devices 10 transmitting the provisional leak information be in the leak detection mode.

As shown in FIG. 7(c), as in the first exemplary embodiment, the host-side leak determination unit 210 of the information processing device 20 determines the presence or absence of a leak in the piping 30 by determining whether or not the number of vibration detection devices 10 transmitting leak information and the relative positions of the vibration detection devices 10 satisfy a leak reference.

The sensor control unit 220 of the information processing device 20 transmits waveform request information to the vibration detection device 10, in which the host-side leak determination unit 210 determines that there is a leak, and a vibration detection device 10 adjacent thereto. In the example of this drawing, as in the first exemplary embodiment, when two adjacent vibration detection devices 10 transmit provisional leak information, it is determined that there is a leak in the piping 30 between the two vibration detection devices 10, and waveform request information is transmitted to the two vibration detection devices 10.

As shown in FIG. 7(d), the operation mode of the two vibration detection devices 10 which receive the waveform request information is switched from the leak detection mode to the leak position detection mode.

Figure 8:
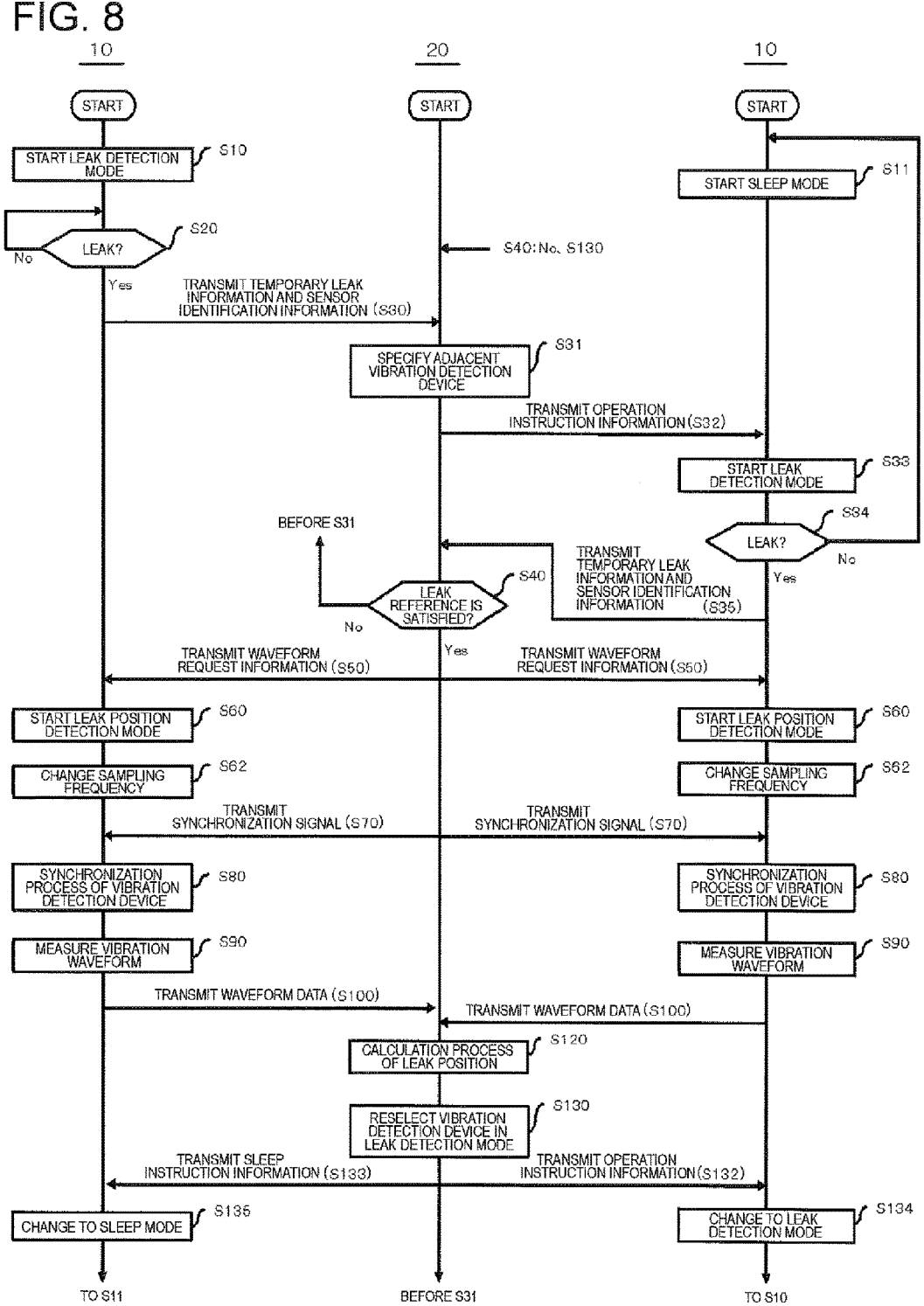
FIG. 8 is a flowchart showing a process described referring to FIG. 7 in detail.

FIG. 8 is a flowchart showing a process described referring to FIG. 7 in detail. In the process shown in this drawing, a plurality of vibration detection devices 10 are in the leak detection mode at intervals of predetermined number of vibration detection devices 10 in the extension direction of the piping 30 (Step S10). The remaining vibration detection devices 10 are in the sleep mode (Step S11).

The process shown in Step S20 and S30 is as described referring to FIG. 5 in the first exemplary embodiment. When the sensor identification information and the provisional leak information are transmitted from any vibration detection device 10, the sensor control unit 220 of the information processing device 20 specifies a vibration detection device 10 located adjacent to the vibration detection device 10 using the sensor identification information (Step S31). The sensor control unit 220 transmits the operation instruction information to the specified vibration detection device 10 (Step S32). The vibration detection device 10 which receives the operation instruction information is changed from the sleep mode to the leak detection mode (Step S33).

The sensor-side leak determination unit 120 of the vibration detection device 10, which is newly in the leak detection mode, determines whether or not there is a leak based on the detection result of the vibration detection unit 110 (Step S34). When the sensor-side leak determination unit 120 determines that there is no leak, the vibration detection device 10 is returned to the sleep mode (Step S11). When the sensor-side leak determination unit 120 determines that there is a leak, the first transmission unit 130 of the vibration detection device 10 transmits the sensor identification information and the provisional leak information (Step S35).

The host-side leak determination unit 210 of the information processing device 20 determines whether or not a leak reference is satisfied within a predetermined time from Step S32 (Step S40). The leak reference is, for example, receiving the sensor identification information and the provisional leak information from the vibration detection device 10 to which the operation instruction information was transmitted in Step S32. When the leak reference is not satisfied (Step S40: No), the information processing device 20 returns to the process before Step S31.

When the leak reference is satisfied (Step S40: Yes), the waveform request information is transmitted to two adjacent vibration detection devices 10 (Step S50).

Thereafter, both of the two vibration detection devices 10 perform the process of Steps S60 to S100.

The position determination unit 230 of the information processing device 20 calculates a leak position in the piping 30 based on waveform data received from the two vibration detection devices 10 (Step S120).

Thereafter, the sensor control unit 220 of the information processing device 20 reselects the vibration detection device 10 to be in the leak detection mode (Step S130). The operation instruction information is transmitted to the vibration detection devices 10 which are hitherto operated in the sleep mode (Step S132), and sleep instruction information is transmitted to the vibration detection devices 10 which are hitherto operated in the leak detection mode (Step S133). The vibration detection devices 10 which receive the operation instruction information change the operation mode to the leak detection mode (Step S134), and the vibration detection devices 10 which receive the sleep instruction information changes the operation mode to the sleep mode (Step S135).

The timing of changing the vibration detection devices 10, which are in the leak detection mode, is not limited to the above-described example. For example, the sensor control unit 220 may change the vibration detection devices 10, which are in the leak detection mode, for every predetermined period.

Also in this exemplary embodiment, it is possible to obtain the same effects as in the first or second exemplary embodiment. Furthermore, some of a plurality of vibration detection devices 10 are in the sleep mode. Therefore, it is possible to further reduce power consumption of the vibration detection devices 10.

The sensor control unit 220 changes the vibration detection devices 10, which are in the leak detection mode, at a predetermined timing. Therefore, it is possible to suppress consumption of the battery of a specific vibration detection device 10.

Fourth Exemplary Embodiment

A leak detection system according to this exemplary embodiment has the same configuration as the leak detection system according to any one of the first to third exemplary embodiments, excluding that it is determined on the vibration detection device 10 side whether or not to transmit waveform data to the information processing device 20.

Figure 9:
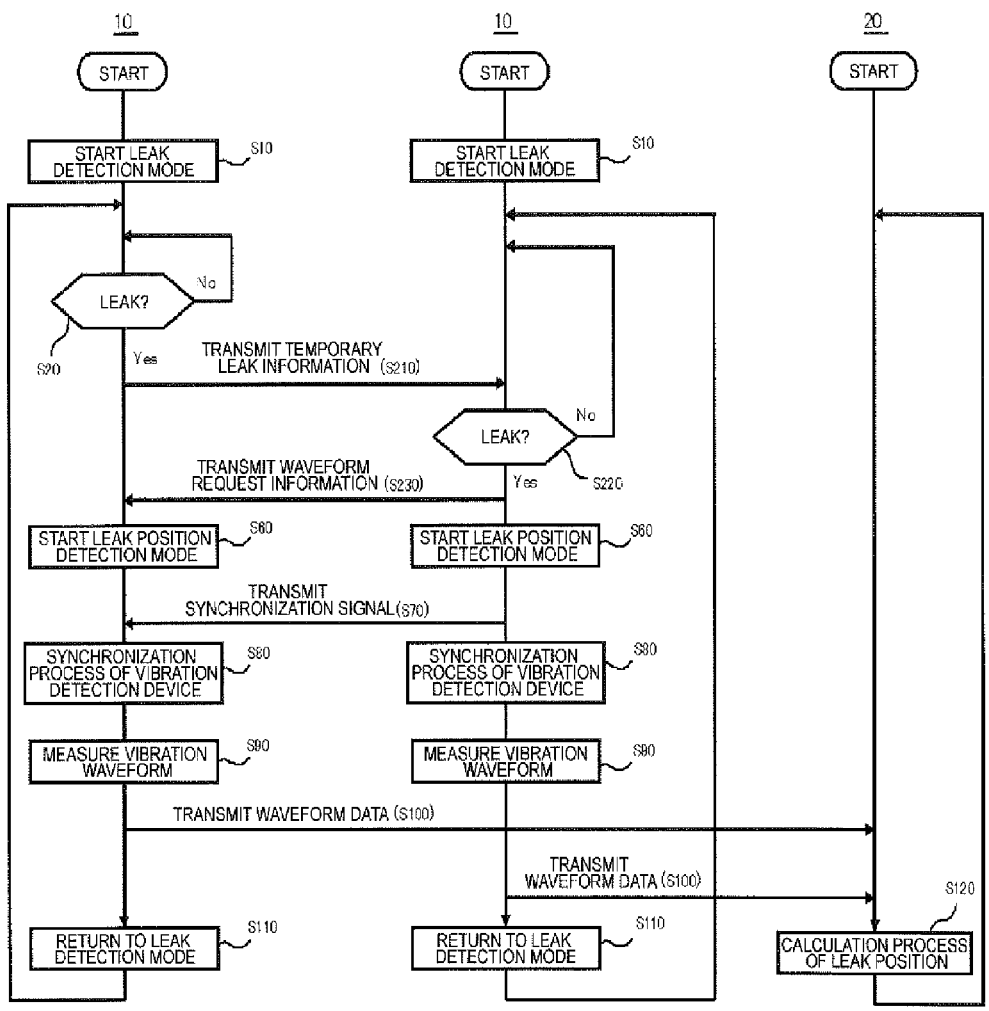
FIG. 9 is a flowchart showing an example of an operation of a leak detection system according to a fourth exemplary embodiment.

FIG. 9 is a flowchart showing an example of an operation of the leak detection system according to this exemplary embodiment. First, all of a plurality of vibration detection devices 10 are operated in the leak detection mode (Step S10). The sensor-side leak determination unit 120 of each of the vibration detection devices 10 regularly determines whether or not there is a leak based on a detection result of the vibration detection unit 110 (Step S20). The frequency is, for example, once per day; however, the invention is not limited thereto. When the sensor-side leak determination unit 120 of a certain vibration detection device 10 determines that there is a leak (Step S20: Yes), the first transmission unit 130 of the vibration detection device 10 transmits provisional leak information to the first transmission unit 130 of at least one adjacent vibration detection device 10 along with sensor identification information of the vibration detection device 10 (Step S210). The first transmission unit 130 may transmit the sensor identification information as the provisional leak information.

When the sensor-side leak determination unit 120 determines that there is a leak (Step S220: Yes), the sensor-side leak determination unit 120 of the vibration detection device 10, which receives the provisional leak information, transmits waveform request information to the vibration detection device 10 transmitting the provisional leak information (Step S230).

The vibration detection device 10 transmitting the provisional leak information and the vibration detection device 10 transmitting the waveform request information (that is, two adjacent vibration detection devices 10) start the leak position detection mode (Step S60), and perform the process of Step S70 to S100 of FIG. 5.

The position determination unit 230 of the information processing device 20 calculates a leak position in the piping 30 based on waveform data received from the above-described two adjacent vibration detection devices 10 (Step S120).

Also in this exemplary embodiment, as in the first exemplary embodiment, it is possible to suppress power consumption of the vibration detection devices 10. With this, it is possible to reduce the maintenance frequency of the vibration detection devices 10.

Fifth Exemplary Embodiment

Figure 10:
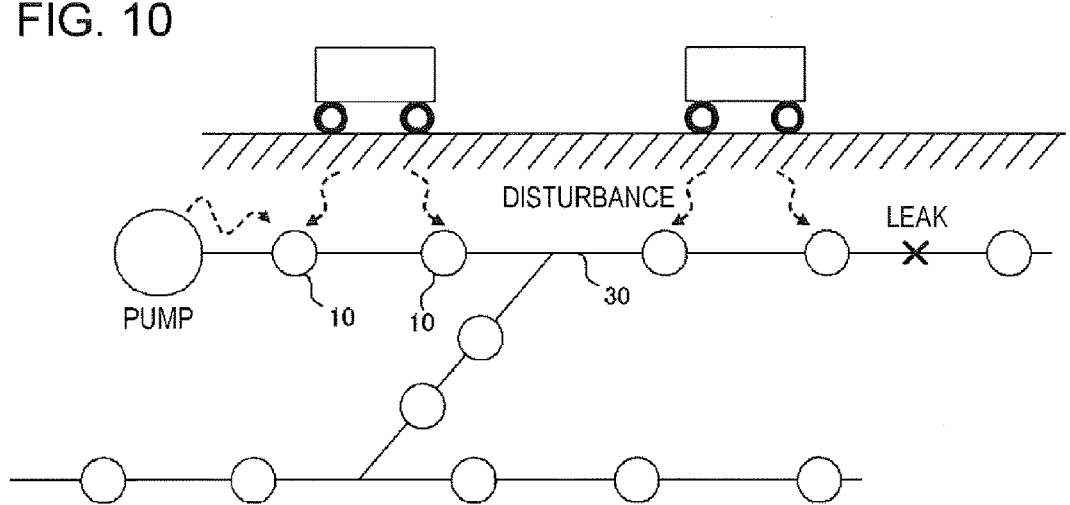
FIG. 10 is a diagram illustrating an installation environment of a leak detection system according to a fifth exemplary embodiment.

As shown in FIG. 10, when the piping 30 is buried in a road or the like, disturbance due to the passage of a vehicle or the like enters the vibration detection devices 10. This exemplary embodiment is the same as the leak detection system according to the fourth exemplary embodiment, excluding that, in the case of disturbance, the vibration detection devices 10 do not transmit waveform data.

Figure 11:
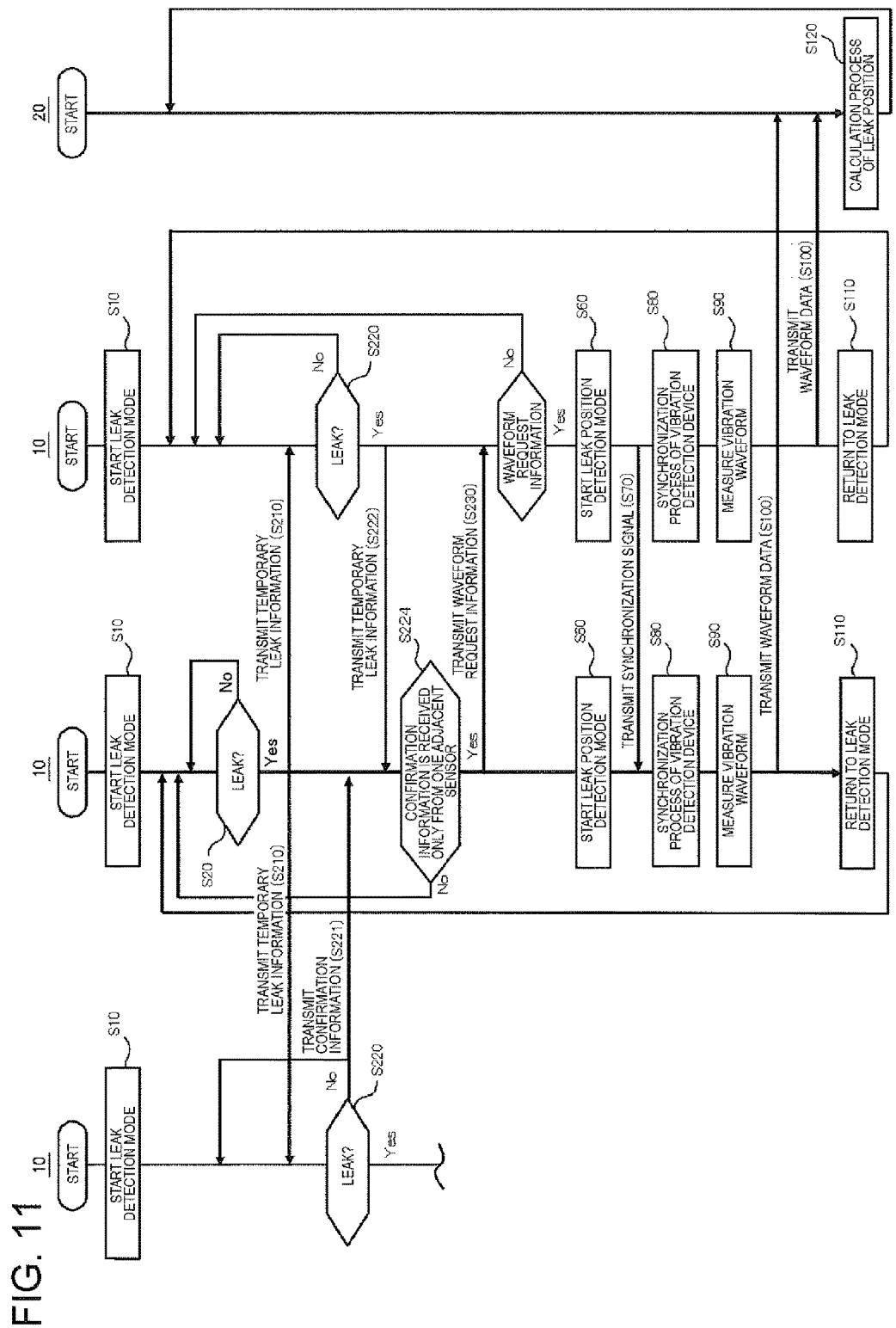
FIG. 11 is a flowchart showing an example of an operation of the leak detection system according to the fifth exemplary embodiment.

FIG. 11 is a flowchart showing an example of an operation of a leak detection system according to this exemplary embodiment, and corresponds to FIG. 9 in the fourth exemplary embodiment. In this exemplary embodiment, when the sensor-side leak determination unit 120 of a certain vibration detection device 10 determines that there is a leak (Step S20: Yes), the first transmission unit 130 of the vibration detection device 10 transmits provisional leak information to the first transmission unit 130 of both vibration detection devices 10 adjacent to the vibration detection device 10 along with sensor identification information of the vibration detection device 10 (Step S210).

When the sensor-side leak determination unit 120 determines that there is a leak (Step S220: Yes), the sensor-side leak determination unit 120 of each of the vibration detection devices 10, which receive the provisional leak information, transmits the provisional leak information to the first transmission unit 130 of the vibration detection device 10 transmitting the provisional leak information (Step S222). When the sensor-side leak determination unit 120 determines that there is no leak (Step S220: No), the sensor-side leak determination unit 120 of each of the vibration detection devices 10, which receive the provisional leak information, transmit confirmation information to the effect that there is no leak to the first transmission unit 130 of the vibration detection device 10 transmitting the provisional leak information (Step S221).

When the provisional leak information is received from both adjacent vibration detection devices 10 (Step S224: No), the sensor-side leak determination unit 120 of the vibration detection device 10 initially transmitting the provisional leak information determines that this is owing to disturbance and ends the process. When the provisional leak information is received only from one adjacent vibration detection device 10 (Step S224: Yes), the sensor-side leak determination unit 120 progresses the process to Step S230 and steps that follow.

Also in this exemplary embodiment, it is possible to reduce the maintenance frequency of the vibration detection devices 10. Furthermore, since the vibration detection devices 10 do not transmit waveform data in the case of disturbance, it is possible to further suppress power consumption of the vibration detection devices 10. With this, it is possible to further reduce the maintenance frequency of the vibration detection devices 10.

Sixth Exemplary Embodiment

Figure 12:
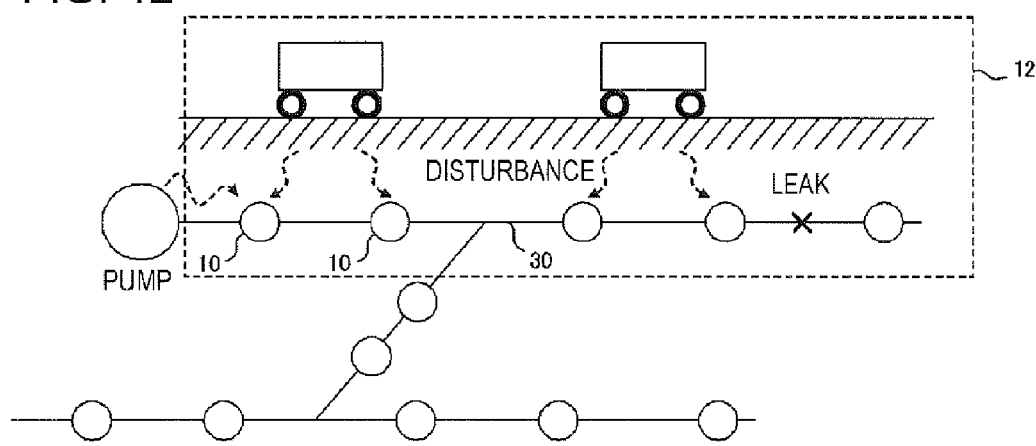
FIG. 12 is a diagram conceptually illustrating a leak detection system according to a sixth exemplary embodiment.

FIG. 12 is a diagram conceptually illustrating a leak detection system according to a sixth exemplary embodiment. The leak detection system has the same configuration as in any one of the first to third exemplary embodiments, excluding that a plurality of vibration detection devices 10 are divided into a plurality of groups 12 in advance. The groups 12 are set for areas where the vibration detection devices 10 are installed. In other words, the vibration detection devices 10 belonging to other groups 12 are not disposed between the vibration detection devices 10 belonging to the same group 12.

Figure 13:
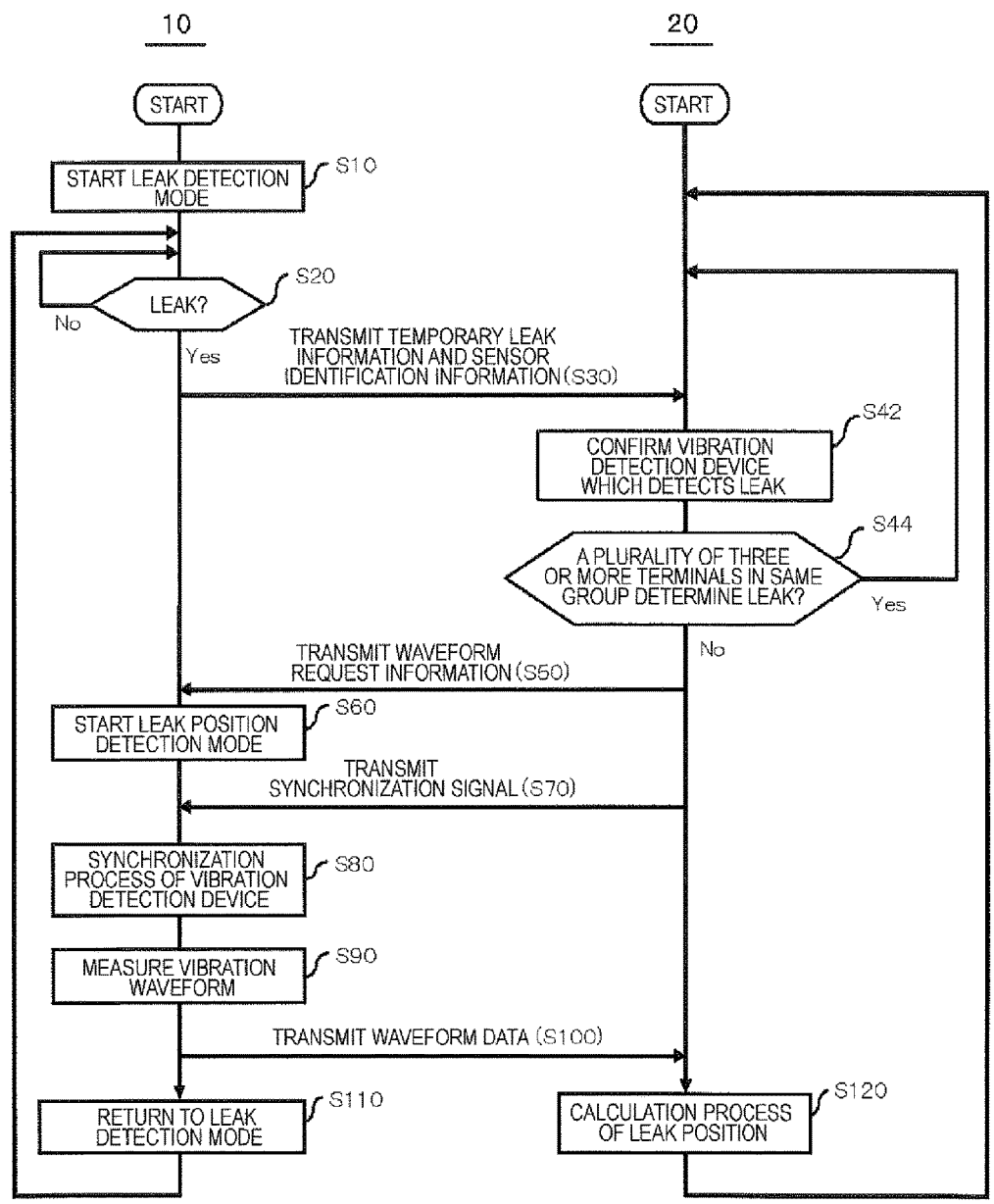
FIG. 13 is a flowchart showing an example of an operation of the leak detection system according to the sixth exemplary embodiment.

FIG. 13 is a flowchart showing an example of an operation of the leak detection system according to this exemplary embodiment, and corresponds to FIG. 5 in the first exemplary embodiment. The operation shown in this drawing is the same as the operation shown in FIG. 5, excluding that Steps S42 and S44 are provided instead of Step S40 of FIG. 5.

The host-side leak determination unit 210 of the information processing device 20 confirms which vibration detection device 10 transmits provisional leak information based on sensor identification information transmitted from the vibration detection devices 10. The host-side leak determination unit 210 stores information indicating the association of the sensor identification information and the groups 12. When the provisional leak information is transmitted from three or more vibration detection devices 10 among the vibration detection devices 10 belonging to the same group 12 (Step S44: Yes), the host-side leak determination unit 210 determines that this is owing to disturbance and ends the process. When the provisional leak information is transmitted from two adjacent vibration detection devices 10 among the vibration detection devices 10 belonging to the same group 12 (Step S44: No), the host-side leak determination unit 210 transmits waveform request information to the two vibration detection devices 10 (Step S50).

In this exemplary embodiment, it is possible to reduce the maintenance frequency of the vibration detection device 10. Since the vibration detection device 10 does not transmit waveform data in the case of disturbance, it is possible to further suppress power consumption of the vibration detection device 10. With this, it is possible to further reduce the maintenance frequency of the vibration detection device 10.

Although the exemplary embodiments of the invention have been described referring to the drawings, these exemplary embodiments are for illustration of the invention, and various configurations other than those described above may be used.

This application claims priority based on Japanese Patent Application No. 2013-065569, filed Mar. 27, 2013, the entire disclosure thereof is incorporated herein by reference.

The invention claimed is:

1. A leak detection system comprising:
   a plurality of vibration detection devices which are attached to piping at intervals in an extension direction of the piping; and
   an information processing device which detects a leak from the piping based on measurement results of the plurality of vibration detection devices,
   wherein each of the plurality of vibration detection devices includes
   a vibration detection unit which detects vibration,
   a sensor-side leak determination unit which determines whether or not there is a possibility of a leak in the piping based on a measurement result of the vibration detection unit,
   a first transmission unit which, when the sensor-side leak determination unit determines that there is a possibility of a leak, transmits provisional leak information indicating that there is a possibility of a leak in the piping to the information processing device, and
   a second transmission unit which, when waveform request information indicating a request for waveform data of the vibration is received from the information processing device, transmits the waveform data measured by the vibration detection unit to the information processing device,
   wherein the information processing device includes
   a host-side leak determination unit which determines the presence or absence of a leak in the piping based on the number and the relative positions of the vibration detection devices transmitting the provisional leak information,
   a sensor control unit which, when the host-side leak determination unit determines that there is a leak, transmits the waveform request information to the vibration detection device transmitting the provisional leak information and the vibration detection device adjacent thereto, and
   a position determination unit which determines a leak position in the piping based on the waveform data transmitted from the vibration detection devices.

2. The leak detection system according to claim 1,
   wherein the sensor control unit of the information processing device selects the vibration detection devices to be operated at intervals of a predetermined number of vibration detection devices in the extension direction of the piping and transmits operation instruction information to the effect of operating the sensor-side leak determination unit to the selected vibration detection devices, and
   the sensor-side determination unit of each of the vibration detection devices is operated when the operation instruction information is received from the information processing device.

3. The leak detection system according to claim 2,
   wherein, when the selected vibration detection devices transmit the provisional leak information, the sensor control unit of the information processing device transmits the operation instruction information to the vibration detection devices located adjacent to the vibration detection devices, and when the selected vibration detection devices and the vibration detection devices located adjacent thereto transmit the provisional leak information, the host-side leak determination unit of the information processing device determines that there is a leak in the piping.

4. The leak detection system according to claim 2, wherein the sensor control unit of the information processing device changes the selected vibration detection devices at a predetermined timing.

5. The leak detection system according to claim 1, wherein the vibration detection unit of each of the vibration detection devices detects vibration at a first sampling frequency before the waveform request information is received from the information processing device and detects vibration at a second sampling frequency higher than the first sampling frequency after the waveform request information is received from the information processing device.

6. The leak detection system according to claim 1, wherein, when amplitude in the measurement result of the vibration detection unit exceeds a reference value, the sensor-side leak determination unit determines that there is a possibility of a leak in the piping.

7. The leak detection system according to claim 6, wherein the reference value is determined for each of a plurality of frequency bands, and when amplitude exceeds the reference value in each of the plurality of frequency bands, the sensor-side leak determination unit determines that there is a possibility of a leak in the piping.

8. The leak detection system according to claim 6 or 7, wherein the sensor-side leak determination unit repeatedly determines at a predetermined interval whether or not there is a possibility of a leak in the piping, and when amplitude exceeds the reference value a predetermined number of times in succession, the sensor-side leak determination unit determines that there is a possibility of a leak in the piping.

9. The leak detection system according to claim 1, wherein, when both of two adjacent vibration detection devices transmit the provisional leak information, the host-side leak determination unit of the information processing device determines that there is a leak in the piping.

10. A leak detection system comprising:
a plurality of vibration detection devices which are attached to piping at intervals in an extension direction of the piping; and
an information processing device which detects a leak from the piping based on measurement results of the plurality of vibration detection devices,
wherein each of the plurality of vibration detection devices includes
a vibration detection unit which detects vibration,
a sensor-side leak determination unit which determines whether or not there is a possibility of a leak in the piping based on a measurement result of the vibration detection unit,
a first transmission unit which, when the sensor-side leak determination unit determines that there is a possibility of a leak, transmits provisional leak information indicating that there is a possibility of a leak in the piping to the vibration detection device adjacent thereto, and a second transmission unit which, when waveform request information indicating a request for waveform data of the vibration is received from the adjacent vibration detection device, transmits the waveform data measured by the vibration detection unit to the information processing device,
wherein the information processing device includes
a host-side leak determination unit which, when two vibration detection devices adjacent to each other transmit the provisional leak information, determines that there is a leak in the piping,
a sensor control unit which, when the host-side leak determination unit determines that there is a leak, transmits the waveform request information to the two adjacent vibration detection devices, and
a position determination unit which determines a leak position in the piping based on the waveform data transmitted from the vibration detection devices.

11. A vibration detection device which is attached to piping at an interval in an extension direction of the piping, the vibration detection device comprising:
a vibration detection unit which detects vibration;
a sensor-side leak determination unit which determines whether or not there is a possibility of a leak in the piping based on a measurement result of the vibration detection unit;
a first transmission unit which, when the sensor-side leak determination unit determines that there is a possibility of a leak, transmits provisional leak information indicating that there is a possibility of a leak to an information processing device; and
a second transmission unit which, when waveform request information indicating a request for waveform data of the vibration is received from the information processing device, transmits a measurement result of the vibration detection unit to the information processing device.

12. The vibration detection device according to claim 11, wherein the vibration detection unit detects vibration at a first sampling frequency before the waveform request information is received from the information processing device and detects vibration at a second sampling frequency higher than the first sampling frequency after the waveform request information is received from the information processing device.

13. A vibration detection device which is attached to piping at an interval in an extension direction of the piping, the vibration detection device comprising:
a vibration detection unit which detects vibration;
a sensor-side leak determination unit which determines whether or not there is a possibility of a leak in the piping based on a measurement result of the vibration detection unit;
first transmission unit which, when the sensor-side leak determination unit determines that there is a possibility of a leak, transmits provisional leak information indicating that there is a possibility of a leak to the vibration detection device adjacent thereto; and
a second transmission unit which, when waveform request information indicating a request for waveform data of the vibration is received from the adjacent vibration detection devices, transmits a measurement result of the vibration detection unit to an information processing device.

14. The vibration detection device according to claim 13, wherein, when the provisional leak information is received from the adjacent vibration detection device, the second transmission unit outputs the waveform request information to the vibration detection device and transmits the measurement result of the vibration detection unit to the information processing device.

15. An information processing device comprising:

a host-side leak determination unit which receives provisional leak information indicating that there is a possibility of a leak from one of a plurality of vibration detection devices attached to piping at intervals in an extension direction of the piping and determining the presence or absence of a leak in the piping based on the number and the relative positions of the vibration detection devices transmitting the provisional leak information;

a sensor control unit which, when the host-side leak determination unit determines that there is a leak, transmits waveform request information to the vibration detection device transmitting the provisional leak information and the vibration detection device adjacent thereto; and a position determination unit which determines a leak position in the piping based on waveform data transmitted from the vibration detection devices.

16. The information processing device according to claim 15, wherein the sensor control unit selects the vibration detection devices to be operated at intervals of a predetermined number of vibration detection devices in the extension direction of the piping and transmits operation instruction information to the effect of operating the vibration detection devices to the selected vibration detection devices.

17. The information processing device according to claim 16, wherein, when the selected vibration detection devices transmit the provisional leak information, the sensor control unit transmits the operation instruction information to the vibration detection devices located adjacent to the vibration detection devices, and when the selected vibration detection devices and the vibration detection devices located adjacent to the vibration detection devices transmit the provisional leak information, the host-side leak determination unit determines that there is a leak in the piping.

18. The information processing device according to claim 16, wherein the sensor control unit changes the selected vibration detection devices at a predetermined timing.

19. A leak detection method, comprising allowing an information processing device to:

receive provisional leak information indicating that there is a possibility of a leak from one of a plurality of vibration detection devices attached to piping at intervals in an extension direction of the piping;

determine the presence or absence of a leak in the piping based on the number and the relative positions of the vibration detection devices transmitting the provisional leak information;

transmit, when it is determined that there is a leak, waveform request information to the vibration detection device transmitting the provisional leak information and the vibration detection device adjacent thereto, the vibration detection devices which receive the waveform request information transmitting measured waveform data to the information processing device; and determine a leak position in the piping based on the waveform data transmitted from the vibration detection devices.

20. A leak detection method, comprising the steps of:

transmitting, when one of a plurality of vibration detection devices attached to piping at intervals in an extension direction of the piping determines that there is a possibility of a leak in the piping, provisional leak information indicating that there is a possibility of a leak in the piping, from the vibration detection device to the vibration detection device adjacent thereto;

transmitting, when it is determined that there is a possibility of a leak in the piping and the provisional leak information is received, waveform request information from the adjacent vibration detection device to the vibration detection device transmitting the provisional leak information;

transmitting measured waveform data from the vibration detection device transmitting the provisional leak information and the adjacent vibration detection device to an information processing device; and determining a leak position in the piping by the information processing device based on the waveform data transmitted from the vibration detection devices.

* * * * *

UNITED STATES PATENT AND TRADEMARK OFFICE
CERTIFICATE OF CORRECTION

| | |
|---|---|
| PATENT NO. | : 9,772,251 B2 |
| APPLICATION NO. | : 14/780126 |
| DATED | : September 26, 2017 |
| INVENTOR(S) | : Shinoda et al. |

It is certified that error appears in the above-identified patent and that said Letters Patent is hereby corrected as shown below:

In the Claims

Claim 8, Column 15, Line 35, "The leak detection system according to claim 6 or 7," should read --The leak detection system according to claim 6,--.

Signed and Sealed this
Thirty-first Day of July, 2018

Andrei Iancu
*Director of the United States Patent and Trademark Office*